United States Patent
Oh et al.

(10) Patent No.: US 10,135,089 B2
(45) Date of Patent: Nov. 20, 2018

(54) BATTERY CELL OF VERTICALLY STACKED STRUCTURE

(71) Applicant: LG Chem, Ltd., Seoul (KR)

(72) Inventors: Sei Woon Oh, Daejeon (KR); Eun Ju Lee, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 310 days.

(21) Appl. No.: 14/744,274

(22) Filed: Jun. 19, 2015

(65) Prior Publication Data
US 2016/0056497 A1    Feb. 25, 2016

(30) Foreign Application Priority Data
Aug. 21, 2014 (KR) .......... 10-2014-0108705

(51) Int. Cl.
| H01M 2/26 | (2006.01) |
| H01M 10/04 | (2006.01) |
| H01M 2/02 | (2006.01) |
| H01M 10/052 | (2010.01) |
| H01M 10/0585 | (2010.01) |

(52) U.S. Cl.
CPC ....... *H01M 10/0463* (2013.01); *H01M 2/021* (2013.01); *H01M 2/0287* (2013.01); *H01M 2/266* (2013.01); *H01M 10/052* (2013.01); *H01M 10/0585* (2013.01); *Y02T 10/7011* (2013.01)

(58) Field of Classification Search
CPC ......... H01M 10/0463; H01M 10/0585; H01M 10/052; H01M 2/021; H01M 2/0287; H01M 2/266; Y02T 10/7011
See application file for complete search history.

(56) References Cited

U.S. PATENT DOCUMENTS

| 4,447,504 A * | 5/1984 | Goebel .................. H01M 6/46 429/101 |
| 5,532,075 A * | 7/1996 | Alexandres ......... H01M 2/1241 429/54 |
| 2010/0028769 A1* | 2/2010 | Enomoto .............. H01M 10/02 429/162 |
| 2010/0330423 A1* | 12/2010 | Cui ........................ H01M 4/38 429/220 |
| 2013/0266834 A1* | 10/2013 | Sawa .................... H01M 4/134 429/94 |

* cited by examiner

*Primary Examiner* — Raymond Alejandro
(74) *Attorney, Agent, or Firm* — Lerner, David, Littenberg, Krumholz & Mentlik, LLP

(57) ABSTRACT

A battery cell is configured to have a structure in which an electrode stack is configured to have a structure in which positive electrodes and negative electrodes are stacked in a height direction. Separators are disposed respectively between the positive electrodes and the negative electrodes, and when mounted in a battery case in a sealed state. The electrode stack is configured to have a structure in which a length in a height direction, which is a stacked direction of the electrode stack, on the basis of the ground is greater than that in a width direction perpendicular to the height direction, and the battery case is formed in the shape of a pipe corresponding to an outside of the electrode stack.

19 Claims, 2 Drawing Sheets

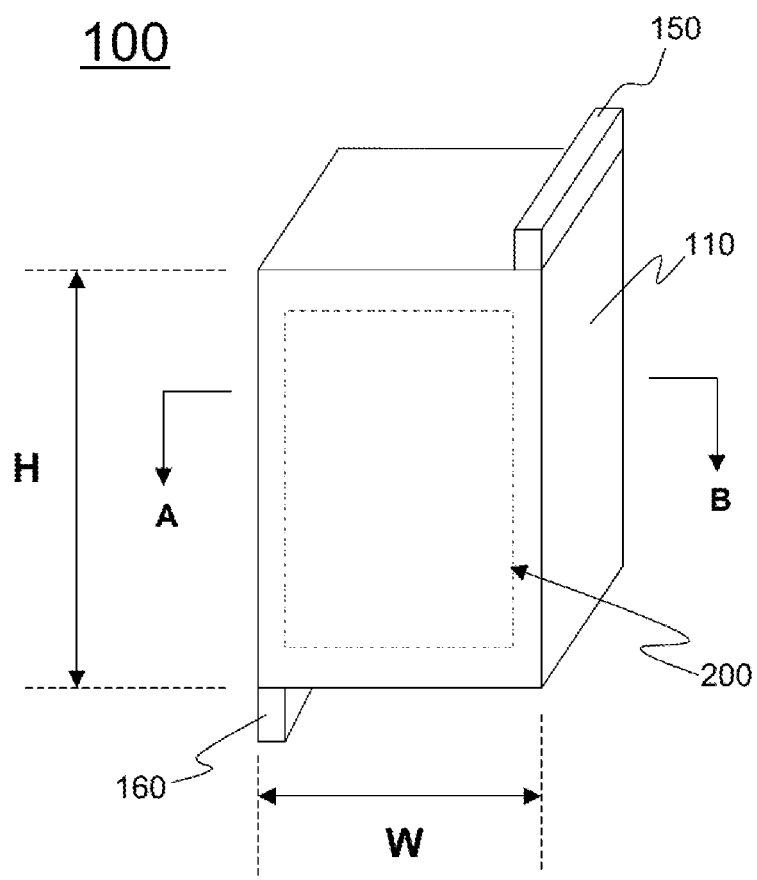
[FIG. 1]

[FIG. 2]
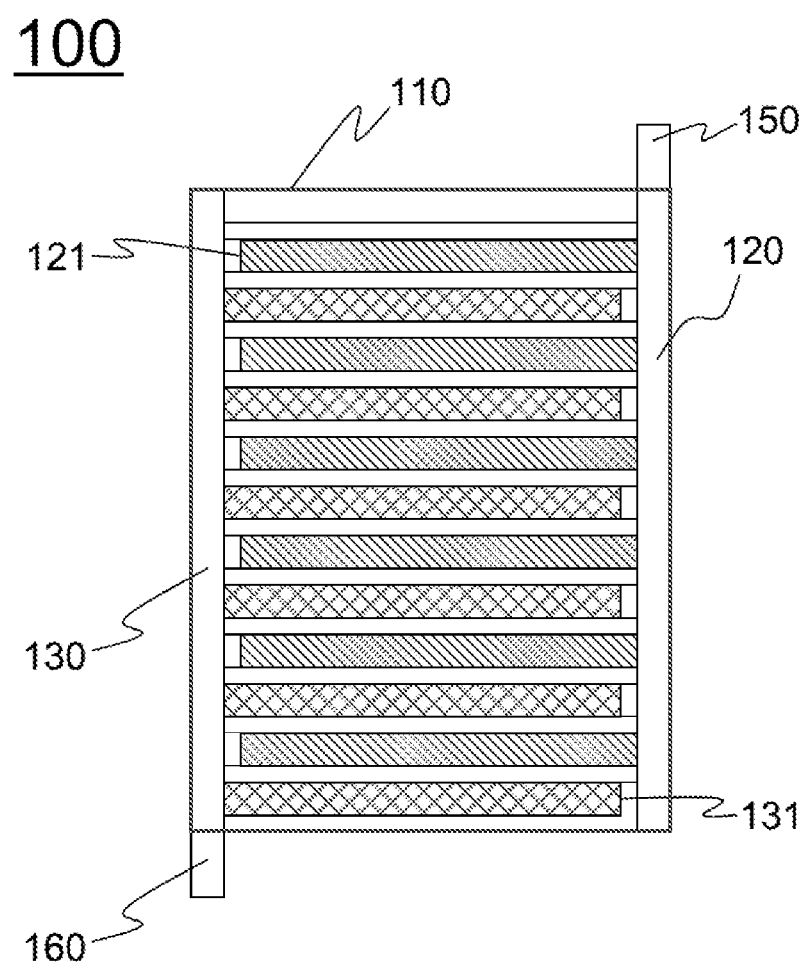

BATTERY CELL OF VERTICALLY STACKED STRUCTURE

CROSS-REFERENCE TO RELATED APPLICATIONS

The present application claims priority from Korean Patent Application No. 10-2014-0108705 filed Aug. 21, 2014, the disclosure of which is hereby incorporated herein by reference.

TECHNICAL FIELD

The present invention relates to a battery cell of a vertically stacked structure.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having a high energy density and discharge voltage, into which much research has been carried out and which is now commercialized and widely used.

In general, a secondary battery is configured to have a structure in which an electrode stack including a positive electrode and a negative electrode stacked or wound in a state in which a separator is disposed between the positive electrode and the negative electrode is mounted in a battery case made of a metal or a laminate sheet, and an electrolyte is injected into the battery case or the electrode stack is impregnated with the electrolyte.

The secondary battery has problems in that the volume of the secondary battery is increased due to swelling of negative electrodes, on each of which an active material is coated, or generation of gas from the secondary battery during the use of the secondary battery, and an electrolyte in the secondary battery is gradually exhausted due to side reactions of the negative electrodes or oxidation of an electrolyte on positive electrodes, whereby the life span of the secondary battery is reduced.

In order to prevent such phenomena, it is important to restrain swelling of the electrodes in the secondary battery with appropriate pressure, thereby increasing efficiency of the secondary battery and thus improving performance of the secondary battery. Conventionally, however, it is not possible to pressurize the entirety of each of the electrodes at uniform pressure.

Therefore, there is a high necessity for a novel lithium secondary battery that is capable of solving the above problems.

DISCLOSURE

Technical Problem

The present invention has been made to solve the above problems and other technical problems that have yet to be resolved.

It is an object of the present invention to provide a secondary battery configured to have a structure in which an electrode stack includes electrodes stacked in a vertical direction on the basis of the ground such that the electrode stack is relatively long in the vertical direction as compared with the area of each of the electrodes so as to uniformly restrain swelling of each of the electrodes of the electrode stack over the entire area of each of the electrodes, and a battery case has a structure corresponding to the electrode stack, thereby effectively restraining swelling of the electrodes and thus greatly improving performance of the secondary battery.

Technical Solution

In accordance with one aspect of the present invention, the above and other objects can be accomplished by the provision of a battery cell configured to have a structure in which an electrode stack, which is configured to have a structure in which positive electrodes and negative electrodes are stacked in a height direction on the basis of a ground in a state in which separators are disposed respectively between the positive electrodes and the negative electrodes, is mounted in a battery case in a sealed state, the electrode stack is configured to have a structure in which a length in a height direction (major axis), which is a stacked direction of the electrode stack, on the basis of the ground is greater than that in a width direction (minor axis) perpendicular to the height direction, and the battery case is formed in the shape of a pipe corresponding to an outside of the electrode stack.

According to the present invention, the electrodes of the electrode stack are stacked in the vertical direction on the basis of the ground such that the electrode stack is relatively long in the vertical direction as compared with the area of each of the electrodes so as to uniformly restrain swelling of each of the electrodes of the electrode stack over the entire area of each of the electrodes, and the structure of the battery case corresponds to that of the electrode stack, thereby effectively restraining swelling of the electrodes.

In a concrete example, the battery cell may be configured to have a structure in which the battery case is provided at one end or opposite ends thereof with external input and output terminals, which protrude from one end or opposite ends of the battery case.

In the above structure, the battery cell may include a positive electrode connection member for connecting the positive electrodes of the electrode stack to the positive electrode input and output terminal and a negative electrode connection member for connecting the negative electrodes of the electrode stack to the negative electrode input and output terminal. The positive electrode connection member and the negative electrode connection member may be disposed in the battery case.

In this case, the positive electrode connection member and the negative electrode connection member may be disposed between the outside of the electrode stack and the inside of the battery case.

In a concrete example, the positive electrode connection member and the negative electrode connection member may each be made of a metal sheet, and the metal sheet may be disposed in a direction facing the outside of the electrode stack.

In addition, according to the present invention, each of the electrodes may include a silicon-based (Si-based) active material or a manganese-based (Mn-based) active material. That is, according to the present invention, it is possible to effectively restrain swelling of the electrodes even when the silicon-based active material or the manganese-based active material, which causes relatively great swelling of the electrodes, is used.

The silicon-based active material may be, but is not limited to, SiO, $SiO_2$, or SiZO ($SnSiO_3$, $MnSiO_3$, $FeSiO_3$, LiTiSiO$_3$, ZnSiO$_3$, or LiSiON) (Z=Sn, Mn, Fe, Li, Zn, or Ti). The manganese-based active material may be, but is not limited to, a lithium manganese oxide represented by a chemical formula Li$_{1+y}$Mn$_{2-y}$O$_4$ (where, y=0 to 0.33) or a lithium manganese oxide, such as LiMnO$_3$, LiMn$_2$O$_3$, or LiMnO$_2$; a lithium manganese composite oxide represented by a chemical formula LiMn$_{2-y}$M$_y$O$_2$ (where, M=Co, Ni, Fe, Cr, Zn, or Ta, and y=0.01 to 0.1) or a chemical formula Li$_2$Mn$_3$MO$_8$ (where, M=Fe, Co, Ni, Cu, or Zn); a lithium manganese composite oxide of a spinel structure including Ni and Mn; LiMn$_2$O$_4$ having Li of a chemical formula partially replaced by alkaline earth metal ions; or a disulfide compound.

The battery case may be made of a laminate sheet comprising a resin layer and a metal layer. For example, the battery case may be made of metal. However, the present invention is not limited thereto.

That is, according to the present invention, the negative electrode connection member is made of the metal sheet according to circumstances. Consequently, the battery case may be made of a polymer material, such as plastic. As compared with a conventional structure in which the battery case is used as the negative electrode, therefore, the battery case may be made of an insulative material, such as a polymer material. Consequently, it is possible to form the battery case in various shapes, to reduce material costs, and to improve insulativity of the battery case.

The electrode stack according to the present invention may be configured to have a stacked type structure, a stacked/folded type structure, or a laminated/stacked type structure.

Hereinafter, the stacked type structure, the stacked/folded type structure, and the laminated/stacked type structure will be described in detail.

First, the stacked type electrode stack may be manufactured by coating each metal current collector with an electrode material mixture, drying and pressing the metal current collector, cutting the metal current collector into a predetermined size to form a positive electrode plate and a negative electrode plate, and stacking the positive electrode plate and the negative electrode plate in a state in which a separator, which is cut into a predetermined size corresponding to the positive electrode plate and the negative electrode plate, is disposed between the positive electrode plate and the negative electrode plate.

The stacked/folded type electrode stack may be manufactured by folding two or more unit cells, each of which is configured to have a structure in which two or more electrode plates are stacked such that a positive electrode and a negative electrode face each other, using one or more separation films in a state in which the unit cells do not overlap or bending a separation film into the size of each of the unit cells and disposing the bent separation film between the unit cells.

The laminated/stacked type electrode stack may be manufactured by coating each metal current collector with an electrode material mixture, drying and pressing the metal current collector, cutting the metal current collector into a predetermined size, and sequentially stacking a negative electrode, a separator, a positive electrode, and a separator from below.

In a concrete example, the major axis length may be 1.2 times or more the minor axis length. Specifically, the major axis length may be 1.5 to 50 times the minor axis length. Preferably, the major axis length may be 2 to 30 times the minor axis length.

The electrode stack may be configured to have various shapes. For example, the electrode stack may be configured to have a circular, oval, or polygonal shape in horizontal section.

According to circumstances, the electrode stack may be configured to have a rectangular or square shape in horizontal section.

In addition, the kind of the prismatic battery cell according to the present invention is not particularly restricted so long as the electrode stack as described above is mounted in the battery case. In a concrete example, the battery cell may be a lithium secondary battery exhibiting high energy density, discharge voltage, and output stability.

The composition, structure, manufacturing method of the battery cell, including the lithium secondary battery, are obvious to persons having ordinary skill in the art to which the present invention pertains, and therefore a detailed description thereof will be omitted.

In accordance with other aspects of the present invention, there are provided a battery pack including one or more prismatic battery cells with the above-stated construction and a device using the battery pack as a power source. Specifically, the device may be selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage device.

The above-described devices are well known in the art to which the present invention pertains, and therefore a detailed description thereof will be omitted.

Effects of the Invention

As is apparent from the above description, in the battery cell of the vertically stacked structure, the electrodes of the electrode stack are stacked in the vertical direction on the basis of the ground such that the electrode stack is relatively long in the vertical direction as compared with the area of each of the electrodes so as to uniformly restrain swelling of each of the electrodes of the electrode stack over the entire area of each of the electrodes, and the structure of the battery case corresponds to that of the electrode stack, thereby effectively restraining swelling of the electrodes and thus improving performance of the battery cell.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a lithium secondary battery including a battery case according to an embodiment of the present invention; and FIG. 2 is a vertical sectional view taken along line A-B of FIG. 1.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

FIG. 1 is a perspective view typically showing a secondary battery according to an embodiment of the present invention, and FIG. 2 is a vertical sectional view taken along line A-B of FIG. 1.

Referring to FIGS. 1 and 2, a battery cell 100 includes an electrode stack 200 including a plurality of stacked unit cells (not shown) and a battery case 110 in which the electrode stack 200 is mounted in a sealed state.

The electrode stack 200 is configured to have a structure in which the unit cells, each of which includes a positive electrode 121, and a negative electrode 131, and a separator (not shown), are sequentially stacked in a vertical direction on the basis of the ground. The battery case 110 is provided at opposite ends thereof with external input and output terminals 150 and 160, which protrude from the opposite ends of the battery case 110.

A positive electrode lead 120 for connecting the positive electrodes 121 of the electrode stack 200 to the positive electrode input and output terminal 150 and a negative electrode lead 130 for connecting the negative electrodes 131 of the electrode stack 200 to the negative electrode input and output terminal 160 are provided between the outside of the electrode stack 200 and the inside of the battery case 110.

The length of the electrode stack 200 in the vertically stacked direction is greater than that of the electrode stack 200 in a horizontal direction on the basis of the ground. The battery case 110 is formed in the shape of a pipe corresponding to the electrode stack 200 such that the electrode stack 200 can be easily mounted in the battery case 110. Specifically, the battery case 110 is configured to have a structure in which a length in a height direction H is about twice a length in a width direction W. In this structure, the positive electrodes and the negative electrodes have smaller areas than in the conventional structure. As a result, the distance between the positive electrode input and output terminal and the negative electrode input and output terminal is reduced and minimized, thereby improving efficiency of the battery.

Even when the electrodes in the battery swell, therefore, swelling surfaces of the electrodes contact and press each other. Furthermore, the electrodes are constrained in the battery case having a size corresponding to the outside of the electrode stack. Consequently, it is possible to effectively restrain an electrode swelling phenomenon.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell comprising:
an electrode stack including rectangular positive electrodes and rectangular negative electrodes stacked in a height direction, the positive and negative electrodes being planar and extending perpendicular to the height direction, the electrode stack further including separators disposed respectively between the positive electrodes and the negative electrodes, the electrode stack being configured to have a structure in which a first dimension in the height direction is greater than a second dimension in a width direction perpendicular to the height direction, the positive electrodes being aligned together to form a first column adjacent a positive electrode connection member, and the negative electrodes being aligned together to form a second column adjacent a negative electrode connection member, the first column and the second column being staggered, such that a central axis of the first column and a central axis of the second column extend in the height direction and are laterally offset from one another, wherein the positive electrode connection member and the negative electrode connection member each extend along the height direction of the electrode stack, and
a battery case disposed about the electrode stack to provide a sealed state, the battery case being formed in the shape of a pipe corresponding to an outside of the electrode stack;
wherein each of the rectangular positive electrodes and rectangular negative electrodes comprises a silicon-based active material or a manganese-based active material;
wherein the battery case is provided with a positive external input and output terminal and a negative external input and output terminal, the positive external input and output terminal being protruded from the positive electrode connection member, and the negative external input and output terminal being protruded from the negative electrode connection member.

2. The battery cell according to claim 1, wherein the positive electrode connection member and the negative electrode connection member are disposed in the battery case.

3. The battery cell according to claim 2, wherein the positive electrode connection member and the negative electrode connection member are disposed between an outside of the electrode stack and an inside of the battery case.

4. The battery cell according to claim 3, wherein the positive electrode connection member and the negative electrode connection member each are made of a metal sheet, and the metal sheet is disposed in a direction facing the outside of the electrode stack.

5. The battery cell according to claim 1, wherein the battery case is made of a laminate sheet comprising a resin layer and a metal layer.

6. The battery cell according to claim 1, wherein the battery case is made of metal or plastic.

7. The battery cell according to claim 1, wherein the electrode stack is configured to have a stacked structure, a stacked/folded structure, or a laminated/stacked structure.

8. The battery cell according to claim 1, wherein the first dimension is 1.2 times or more the second dimension.

9. The battery cell according to claim 8, wherein the first dimension is 1.5 to 50 times the second dimension.

10. The battery cell according to claim 9, wherein the first dimension is 2 to 30 times the second dimension.

11. The battery cell according to claim 1, wherein the electrode stack is configured to have a rectangular or square shape in horizontal section.

12. The battery cell according to claim 1, wherein the battery cell is a lithium secondary battery.

13. The battery cell according to claim 1, wherein the positive electrode connection member is disposed between the first column and an inside of the battery case, and wherein the negative electrode connection member is disposed between the second column and the inside of the battery case.

14. The battery cell according to claim 13, wherein the positive external input and output terminal protrudes from the positive electrode connection member along the height direction, and wherein the negative external input and output terminal protrudes from the negative electrode connection member along the height direction.

15. The battery cell according to claim 14, wherein the positive external input and output terminal protrudes from a first end of the battery case, and wherein the negative external input and output terminal protrudes from a second end of the battery case, the second end being opposite the first end along the height direction.

16. The battery cell according to claim 15, wherein the positive electrode connection member and the positive external input and output terminal are positioned on a first side of the battery case, and wherein the negative electrode connection member and the negative external input and output terminal are positioned on a second side of the battery case, the second side being opposite the first side along the width direction.

17. A battery pack comprising one or more battery cells according to claim 1.

18. A device including the battery pack according to claim 17 as a power source.

19. The device according to claim 18, wherein the device is selected from a group consisting of a laptop computer, a mobile phone, a portable display player, a portable multimedia player, an music player, a digital still camera, a digital video recorder, a smartphone, a global positioning system, a camcorder, an electric vehicle, a hybrid electric vehicle, a plug-in hybrid electric vehicle, and a power storage device.

\* \* \* \* \*